US 8,848,846 B2

(12) United States Patent
Dawid et al.

(10) Patent No.: US 8,848,846 B2
(45) Date of Patent: Sep. 30, 2014

(54) RECEIVER

(75) Inventors: Herbert Dawid, Herzogenrath (DE);
Thorsten Clevorn, Duesseldorf (DE);
Christian Drewes, Germering (DE);
Edgar Bolinth, Korschenbroich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 407 days.

(21) Appl. No.: 12/967,120

(22) Filed: Dec. 14, 2010

(65) Prior Publication Data

US 2012/0147995 A1    Jun. 14, 2012

(51) Int. Cl.
*H04B 7/08* (2006.01)
*H04L 1/02* (2006.01)
*H04B 1/712* (2011.01)
*H04B 1/707* (2011.01)

(52) U.S. Cl.
CPC .............. *H04B 7/0845* (2013.01); *H04B 1/712* (2013.01); *H04B 2001/70724* (2013.01)
USPC ........................................................ 375/347

(58) Field of Classification Search
CPC ......... H04B 7/0845; H04B 1/712; H04L 1/02
USPC ......................................... 375/316, 148, 347
See application file for complete search history.

(56) References Cited

U.S. PATENT DOCUMENTS

| 8,351,488 | B2* | 1/2013 | Dawid et al. ................. 375/148 |
| 2002/0012380 | A1* | 1/2002 | Hottinen et al. ............. 375/130 |
| 2006/0093056 | A1 | 5/2006 | Kaasila et al. |
| 2006/0183439 | A1* | 8/2006 | Erceg ............................ 455/101 |
| 2009/0238246 | A1* | 9/2009 | Dawid et al. ................. 375/148 |

FOREIGN PATENT DOCUMENTS

CN            101069397 A     11/2007

* cited by examiner

*Primary Examiner* — Kevin M Burd
(74) *Attorney, Agent, or Firm* — Eschweiler & Associates, LLC

(57) ABSTRACT

A receiver includes a plurality of receive antennas configured to receive radio signals from a plurality of transmit antennas, and a plurality of sets of RAKE fingers configured to generate first signals, wherein each set of RAKE fingers is coupled to a respective one of the plurality of receive antennas. The receiver further includes a weighting factor generator configured to generate weighting factors for weighting the first signals, wherein at least one of the weighting factors is generated by using first signals that are generated by at least two of the plurality of sets of RAKE fingers and received from at least two of the plurality of transmit antennas.

25 Claims, 10 Drawing Sheets

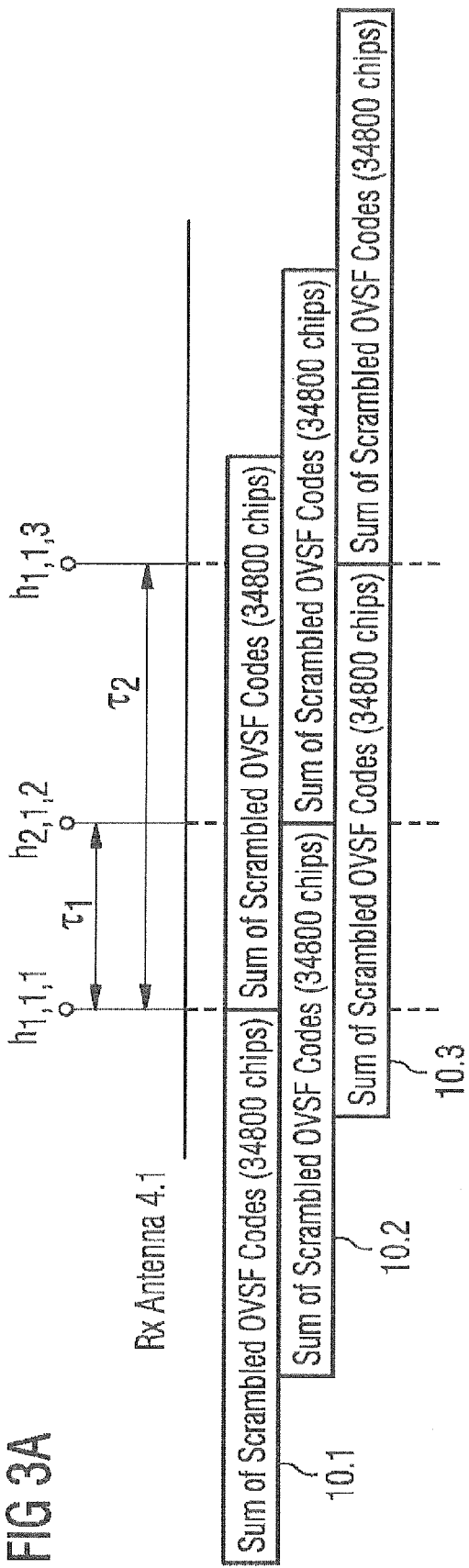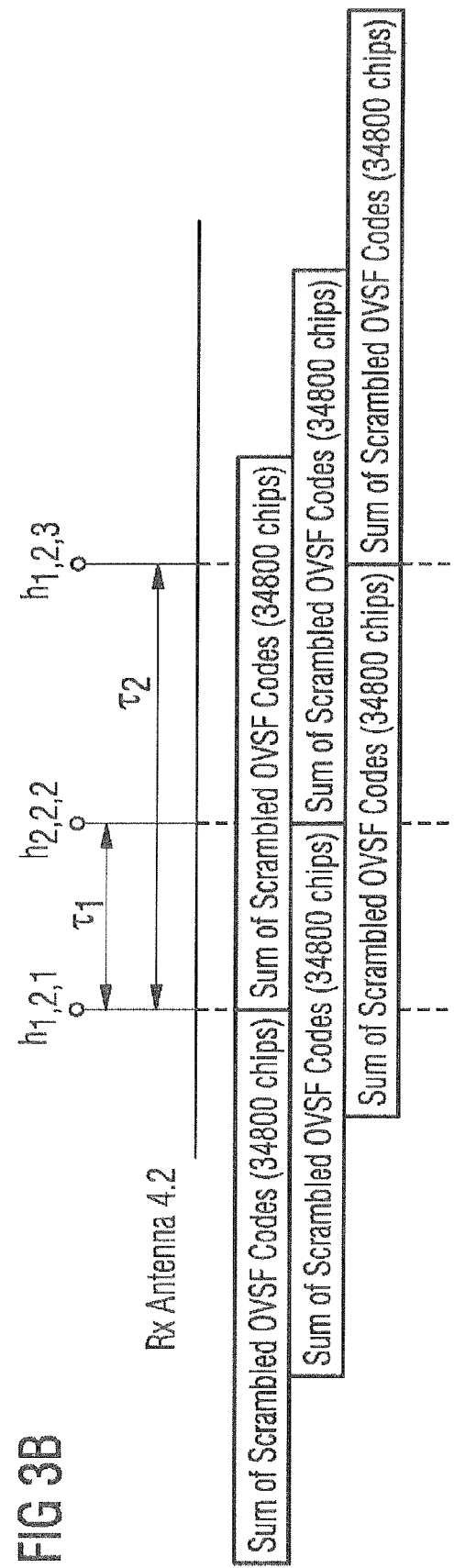

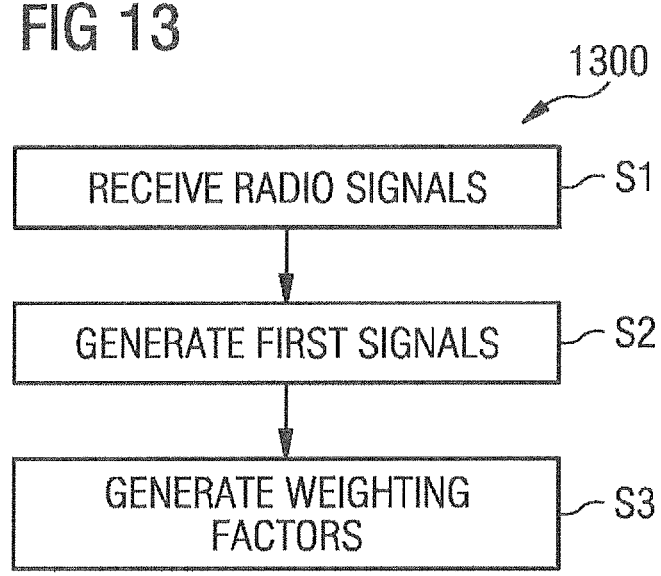

RECEIVER

FIELD

The invention relates to a receiver and a method for processing data in a receiver. In particular, the invention relates to improving the quality of receivers by means of interference cancellation.

BACKGROUND

In a radio frequency communications system, a transmitter and a receiver may include multiple transmit and receive antennas, respectively. Signals propagating from the transmit antennas to the receive antennas via different transmission channels may be deteriorated or lost due to multipath fading or shadowing. Interference and noise may occur during signal transmission, propagation over the different transmission channels, and signal reception.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

FIG. 3A schematically illustrates a structure of a signal.

FIG. 3B schematically illustrates a structure of a further signal.

FIG. 13 schematically illustrates a method 1300 as an exemplary embodiment.

DETAILED DESCRIPTION

Figure 1:
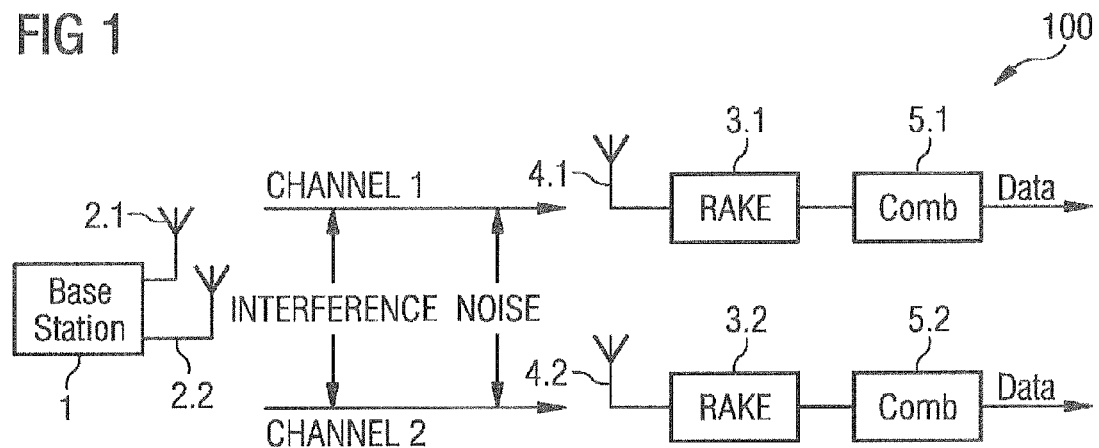
FIG. 1 schematically illustrates a radio frequency communications system 100.

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense, and the scope of protection is defined by the appended claims.

The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made without departing from the scope of the present disclosure.

In addition, while a particular feature or aspect of an embodiment may be disclosed with respect to only one of several implementations, such feature or aspect may be combined with one or more other features or aspects of the other implementations as may be desired and advantageous for any given or particular application. Further, to the extent that the terms "include", "have", "with" or other variants thereof are used in either the detailed description or the claims, such terms are intended to be inclusive in a manner similar to the term "comprise". Also, the term "exemplary" is merely meant as an example, rather than the best or optimal.

The devices and methods described herein may be used for various wireless communication networks such as Code Division Multiple Access (CDMA), Time Division Multiple Access (TDMA), Frequency Division Multiple Access (FDMA), Orthogonal FDMA (OFDMA) and Single Carrier FDMA (SC-FDMA) networks. The terms "network" and "system" are often used interchangeably. A CDMA network may implement a radio technology such as Universal Terrestrial Radio Access (UTRA), cdma2000, etc. UTRA includes Wideband-CDMA (W-CDMA) and other CDMA variants. cdma2000 covers IS-2000, IS-95, and IS-856 standards. A TDMA network may implement a radio technology such as Global System for Mobile Communications (GSM) and derivatives thereof such as e.g. Enhanced Data Rate for GSM Evolution (EDGE), Enhanced General Packet Radio Service (EGPRS), etc. An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS).

In radio communications systems, a transmitter transmitting one or more radio communications signals on one or more radio communications channels may be present. In particular, the transmitter may be a base station or a transmitting device included in a user's device, such as a mobile radio transceiver, a handheld radio device or any similar device. Radio communications signals transmitted by transmitters may be received by receivers such as a receiving device in a mobile radio transceiver, a handheld radio device or any similar device. In particular, radio communications systems as disclosed herein may include UMTS systems which may conform to the 3GPP standard for UMTS systems. Radio communications signals as disclosed herein may be provided in UMTS systems, in particular over radio communications physical channels, such as primary common pilot channels, secondary common pilot channels, dedicated physical channels, dedicated physical control channels or similar channels according to the UMTS standard.

The contents of the United States Patent Application, Pub. No. US 2009/0238246 A1 are incorporated by reference in its entirety.

FIG. 1 schematically illustrates a radio frequency communications system 100 including a base station 1 having transmit antennas 2.1, 2.2, RAKE receivers 3.1, 3.2, receive antennas 4.1, 4.2 and combining units 5.1, 5.2. It is understood that the radio frequency communications system 100 may include further transmit and receive antennas which are not shown for the sake of simplicity. During operation of the communications system 100, the base station 1 transmits radio frequency signals over the transmit antennas 2.1, 2.2. The radio frequency signals are transmitted over the air interface and propagate from the transmit antennas 2.1, 2.2 to the receive antennas 4.1, 4.2 via different transmission channels. In FIG. 1, two exemplary transmission channels are indicated as "CHANNEL 1" and "CHANNEL 2". Interference and noise occurring between the different transmission channels (cf. "INTERFERENCE", "NOISE") may result in a degraded link quality.

The radio signals transmitted over the first transmission channel (cf. "CHANNEL 1") are received at the receive antenna 4.1 and processed in the RAKE receiver 3.1. Similarly, the radio signals transmitted over the second transmission channel (cf. "CHANNEL 2") are received at the receive antenna 4.2 and processed in the RAKE receiver 3.2. The RAKE receivers 3.1 and 3.2 may output a plurality of signals which are combined by the combining units 5.1 and 5.2, respectively. Each of the combining units 5.1 and 5.2 outputs a data stream which may be further processed, for example by a digital signal processor (not shown).

The units 3.1, 3.2, 4.1, 4.2, 5.1 and 5.2 form a diversity receiver including at least two receive antennas 4.1, 4.2. Since the signals transmitted by the transmit antennas 2.1, 2.2 propagate via different transmission channels and since each of the transmission channels experiences different multipath fading and shadowing, the use of multiple antennas and a combination of the received and processed signals may result in an improved link quality.

In one of many ways, diversity receivers may receive signals which are so-called multicarrier signals. Multicarrier signals are produced by splitting a signal to be transmitted into a plurality of sub-signals, each of which is transmitted separately on an individual frequency carrier. A receiver receives the sub-signals from each of the carriers and recombines them to reproduce the original signal. In multicarrier transmission systems, diversity receivers may take advantage of the fact that the multipath fading and shadowing on the different antennas is not identical such that, when one antenna receives a multicarrier signal comprising faded sub-signals, chances are that another antenna receives these sub-signals without fading. Combining the multicarrier signals received by the individual antennas may thus mitigate fading.

The radio communications system 100 may reduce the required transmit power for signal transmission between transmitter and receiver. Usually the receiver performance is limited by multipath and inter-cell interference, i.e. even for the case of zero noise, the bit and block error rates run into a limiting error floor. In order to provide a certain link quality, the received energy per transmitted bit needs to be constant. For example, high data rate links or terminals located at unfavorable places like cell edges require a large amount of the cell's power budget and therefore cut down capacity. By using a diversity receiver, the required transmit power may be reduced and a decrease in capacity may be avoided. However, performance is still interference limited, wherein interference sources are multipath and inter-cell interference. The interference terms are correlated spatially, i.e. between two different transmission channels.

Figure 2:
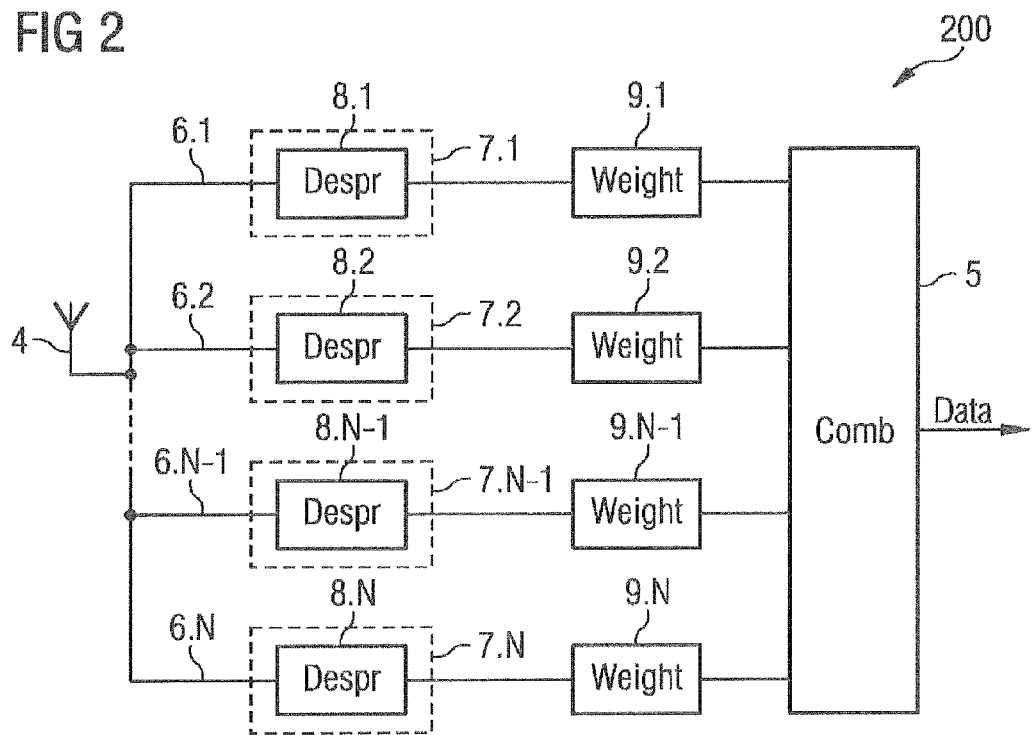
FIG. 2 schematically illustrates a RAKE receiver 200.

FIG. 2 schematically illustrates a RAKE receiver 200 including a receive antenna 4 and N signal paths 6.1 to 6.N. Each of the signal paths 6.1 to 6.N includes a RAKE finger 7.1 to 7.N which may include despreaders 8.1 to 8.N. The signal paths 6.1 to 6.N further include weighting units 9.1 to 9.N connected to a combining unit 5. The RAKE receiver 200 may include further components which are not illustrated for the sake of simplicity.

The receive antenna 4 receives radio signals which are processed in the N signal paths 6.1 to 6.N. Usually the receive antenna 4 receives analog signals in a radio frequency range which are first down-converted into an intermediate frequency band or into the baseband by a down-conversion unit (not shown). After down-conversion, the analog signal is usually converted to a digital signal by means of an Analog-to-Digital Converter (ADC) (not shown) to provide digital samples. The digital samples may include in-phase (I) and quadrature (Q) components that are divided into digital streams of I and Q samples. The RAKE receiver 200 may further include amplifiers, analog filters, digital filters, etc.

Due to multiple propagation paths, the receive antenna 4 receives multiple images (or versions) of the transmitted signal with each signal image generally suffering from a different path delay, phase and attenuation effects. In the RAKE receiver 200, each of the signal paths 6.1 to 6.N and each of the RAKE fingers 7.1 to 7.N is allocated to a particular one of the multipath propagation paths of the signal received at the receive antenna 4. That is, each of the RAKE fingers 7.1 to 7.N receives its own image (or version) of the originally transmitted signal. Each of the RAKE fingers 7.1 to 7.N may be time-aligned to process its input signal at an assigned path delay. For this purpose, each of the signal paths 6.1 to 6.N may include delay elements (not shown) to delay the digital signals corresponding to the respective delays between the multiple propagation paths.

The signals received at the receive antenna 4 may be spread by means of a spreading code used in conventional CDMA communications systems. Each of the spread multipath signals is despread in the RAKE fingers 7.1 to 7.N using the despreaders (or correlators) 8.1 to 8.N. It is understood that the RAKE fingers 7.1 to 7.N may include further components. For example, in case of a Direct Sequence Spread Spectrum (DSSS)-CDMA communication, the RAKE fingers 7.1 to 7.N may include a plurality of despreaders each operating on a different DSSS data signal. The despreaders 8.1 to 8.N correlate the spread signals with a chip sequence to obtain corresponding despread signals. The chip sequence may be generated by a chip sequence generator (not shown).

After despreading, the despread signals processed in the signal paths 6.1 to 6.N are weighted by weighting units 9.1 to 9.N. The weighting factors used for this purpose merely depend on the despread signal of the respective signal path. The weighted signals are then combined by the combining unit 5. For example, the combining unit 5 may be based on a maximum ratio combining (MRC) technique to obtain a combined signal with a maximum signal-to-noise ratio and a minimized bit error rate.

The RAKE receiver 200 of FIG. 2 may be incorporated into the communications system 100 of FIG. 1. Regarding FIGS. 1 and 2, it becomes apparent that signals received at the receive antennas 4.1 and 4.2 are processed independently from each other. That is, the diversity receiver architecture as shown in FIG. 1 does not consider existing correlations between signals received at two different receive antennas 4.1 and 4.2. In particular, the weights used for weighting a despread signal in a path merely depend on the signals assigned to the respective path.

FIG. 3A schematically illustrates the structure of a radio signal as it may be received by the receive antenna 4.1. The illustrated signal may be based on the OVSF (Orthogonal Variable Spreading Factor) technique as it may be used for the CDMA downlink. The sequences 10.1, 10.2 and 10.3 show signals received via different transmission paths at the first receive antenna 4.1. In particular, the sequence 10.1 corresponds to a first transmission path, the sequence 10.2 corresponds to a second transmission path, and the sequence 10.3 corresponds to a third transmission path. Each of the sequences 10.1, 10.2 and 10.3 includes various frames, each frame consisting of 34800 chips. As previously explained, due to multiple transmission paths of the received signal, the receive antenna 4.1 receives multiple images (or versions) of the transmitted signal, with each signal image generally suffering from a different path delay, phase and attenuation effects. Accordingly, the sequences 10.1, 10.2 and 10.3 may be delayed with respect to one another.

The time delay between the sequence 10.1 and the sequence 10.2 is indicated by $\tau_1$, whereas the time delay between the sequence 10.1 and the sequence 10.3 is indicated by $\tau_2$. Note that signals broadcast by different transmit antennas of the same transmitter, but transmitted over an identical transmission path may be supposed to have an identical time delay. In other words, signals sent by different transmit antennas of the same transmitter, but transmitted over an identical transmission path are processed in the same RAKE finger. Each of the sequences 10.1, 10.2 and 10.3 may be associated to a channel weight $h_{i,j,k}$. Here, the index i denotes the transmit antenna the signal was sent by, the index j denotes the receive antenna the signal was received at and the index k denotes the transmission path (i.e. the respective RAKE finger). For example, the channel weight $h_{1,2,1}$ refers to the signal broadcast by the first transmit antenna 2.1, transmitted via the first transmission path and received at the second receive antenna 4.2.

FIG. 3B schematically illustrates the structure of a further radio signal as it may be received by the receive antenna 4.2. The signals of FIGS. 3A and 3B have a similar structure. However, the channel weights of the two signals may differ due to the different positions of the receive antennas 4.1 and 4.2. There may occur correlation between the received signals of the receive antennas 4.1 and 4.2 which may include scrambling code auto-correlations (noise-like inter-path interference) and scrambling code cross-correlations (noise-like inter-cell interference). As will be explained later, correlation between the signals received at the receive antennas 4.1 and 4.2 may be exploited for interference whitening and interference cancellation.

Figure 4:
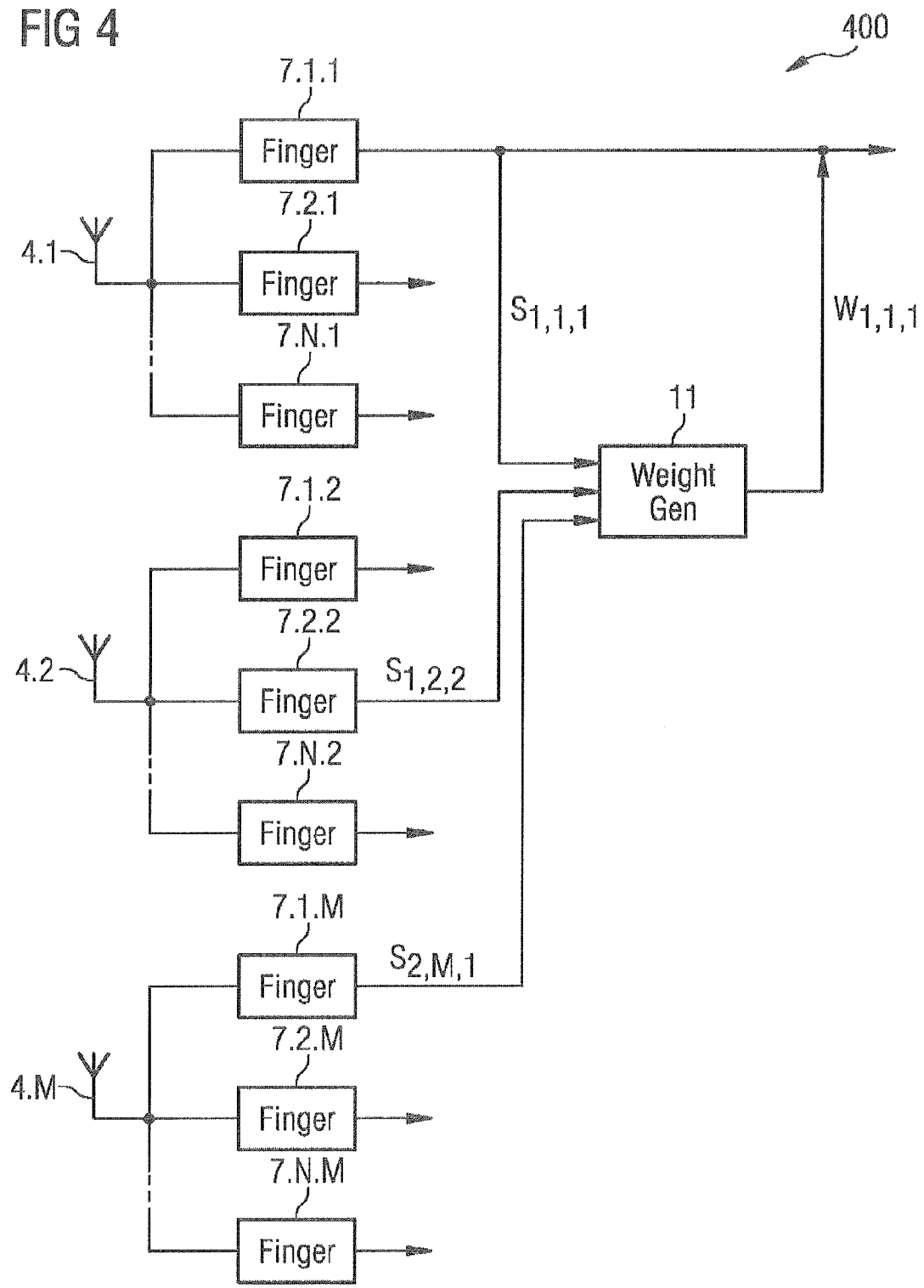
FIG. 4 schematically illustrates a receiver 400 as an exemplary embodiment.

FIG. 4 schematically illustrates a receiver 400 as an exemplary embodiment. The receiver 400 includes M receive antennas 4.1 to 4.M to receive radio signals from a plurality of transmit antennas and a plurality of sets of RAKE fingers 7.1.1 to 7.N.M. The RAKE fingers 7.1.1 to 7.N.M are configured to generate first signals, each set of RAKE fingers being coupled to a respective one of the plurality of antennas. For example, the set of RAKE fingers 7.1.1 to 7.N.1 is connected to the receive antenna 4.1. Hence, the set of RAKE fingers 7.1.1 to 7.N.1 processes radio signals received at the receive antenna 4.1, wherein the received radio signals may have been sent by various transmit antennas of a transmitter and transmitted via multiple propagation paths.

The receiver 400 further includes a weighting factor generator 11 to generate weighting factors for weighting the first signals. The weighting factor generator 11 may be implemented in hardware. Alternatively, the weighting factor generator 11 may include a digital signal processor (not shown) performing arithmetic operations required to obtain the weighting factors. For example, the outputs of the RAKE fingers 7.1.1, 7.2.2 and 7.1.M are forwarded to the weighting factor generator 11. In FIG. 4, three signals $s_{1,1,1}$, $s_{1,2,2}$, and $s_{2,m,1}$ are input to the weighting factor generator 11, wherein the three indices of the signals correspond to the three indices i, j and k of the channel weights already described in connection with FIGS. 3A and 3B. For example, the signal $s_{1,2,2}$ corresponds to a signal that includes data sent by a first transmit antenna, received by the second receive antenna 4.2 over a second transmission channel. In order to distinguish signals sent by different transmit antennas, the receiver 400 may further include a decoupling unit (not shown) to decouple received data with respect to the transmit antennas the received data was sent from.

The weighting factor generator 11 calculates and outputs a weighting factor $w_{1,1,1}$ to weight the signal sent by the first transmit antenna, received at the first receive antenna 4.1 and processed by the RAKE finger 7.1.1. As it can be seen from FIG. 4, the generated weighting factor $w_{1,1,1}$ depends on first signals generated by at least two of the plurality of sets of RAKE fingers and received from at least two of the plurality of transmit antennas. In contrast to this, each of the weighting factors employed by the weighting units 9.1 to 9.N of FIG. 2 merely depends on signals received by only one receive antenna. Since the weighting factor unit 11 takes into account signals coming from more than one transmit antennas and more than one receive antennas, correlation between received signals of the two receive antennas 4.1 and 4.2 may be exploited for interference cancellation.

Figure 5:
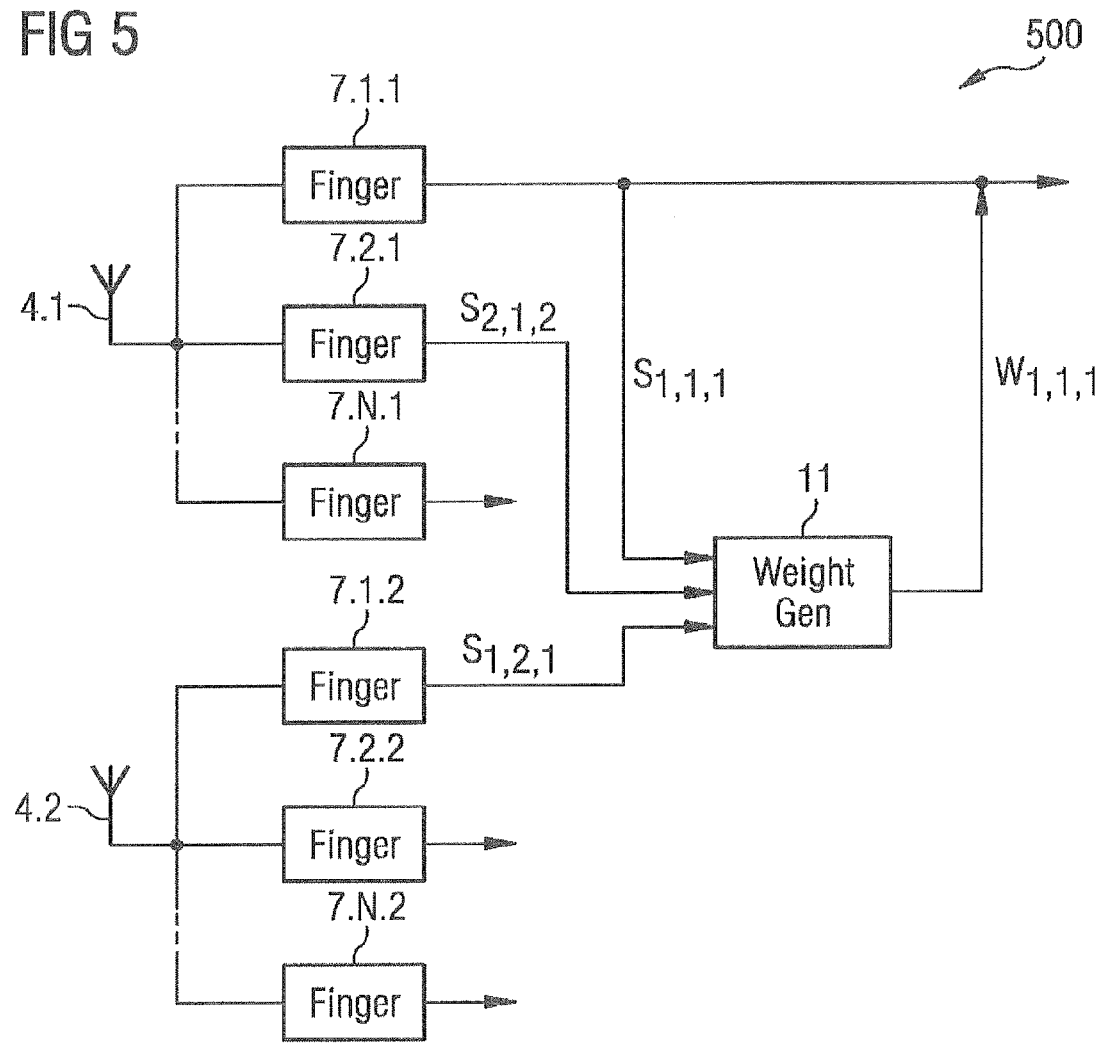
FIG. 5 schematically illustrates a receiver 500 as a further exemplary embodiment.

FIG. 5 schematically illustrates a receiver 500 as a further exemplary embodiment. The receiver 500 includes two receive antennas 4.1 and 4.2 to receive radio signals from a first transmit antenna and a second transmit antenna (not shown). The receiver 500 further includes a plurality of first RAKE fingers 7.1.1 to 7.N.1 coupled to the first receive antenna 4.1 and configured to generate first signals. In a similar way, a plurality of second RAKE fingers 7.1.2 to 7.N.2 is connected to the second receive antenna 4.2 and configured to generate second signals. The receiver 500 further includes a weighting factor generator 11 to generate a first weighting factor which may be used for weighting one of the first signals.

In FIG. 5, signals output by the RAKE fingers 7.1.1, 7.2.1 and 7.1.2 are forwarded to the weighting factor generator 11. The weighing factor generator 11 outputs a weighting factor $w_{1,1,1}$ for weighting the signal generated by the RAKE finger 7.1.1. In general, the weighting factor is generated by using at least one of the first signals and at least one of the second signals, wherein the at least one of the first signals is received from the first transmit antenna and the at least one of the second signals is received from the second transmit antenna.

The weighting factor generator 11 thus generates a weighting factor depending on signals coming from more than one transmit antenna and from more than one receive antenna. In contrast to this, each of the weighting factors employed by the weighting units 9.1 to 9.N of FIG. 2 merely depends on signals received by only one receive antenna. Similar to FIG. 4, taking into account signals coming from more than one transmit and more than one receive antenna, correlation between received signals of the two receive antennas 4.1 and 4.2 may be exploited for interference cancellation.

Figure 6:
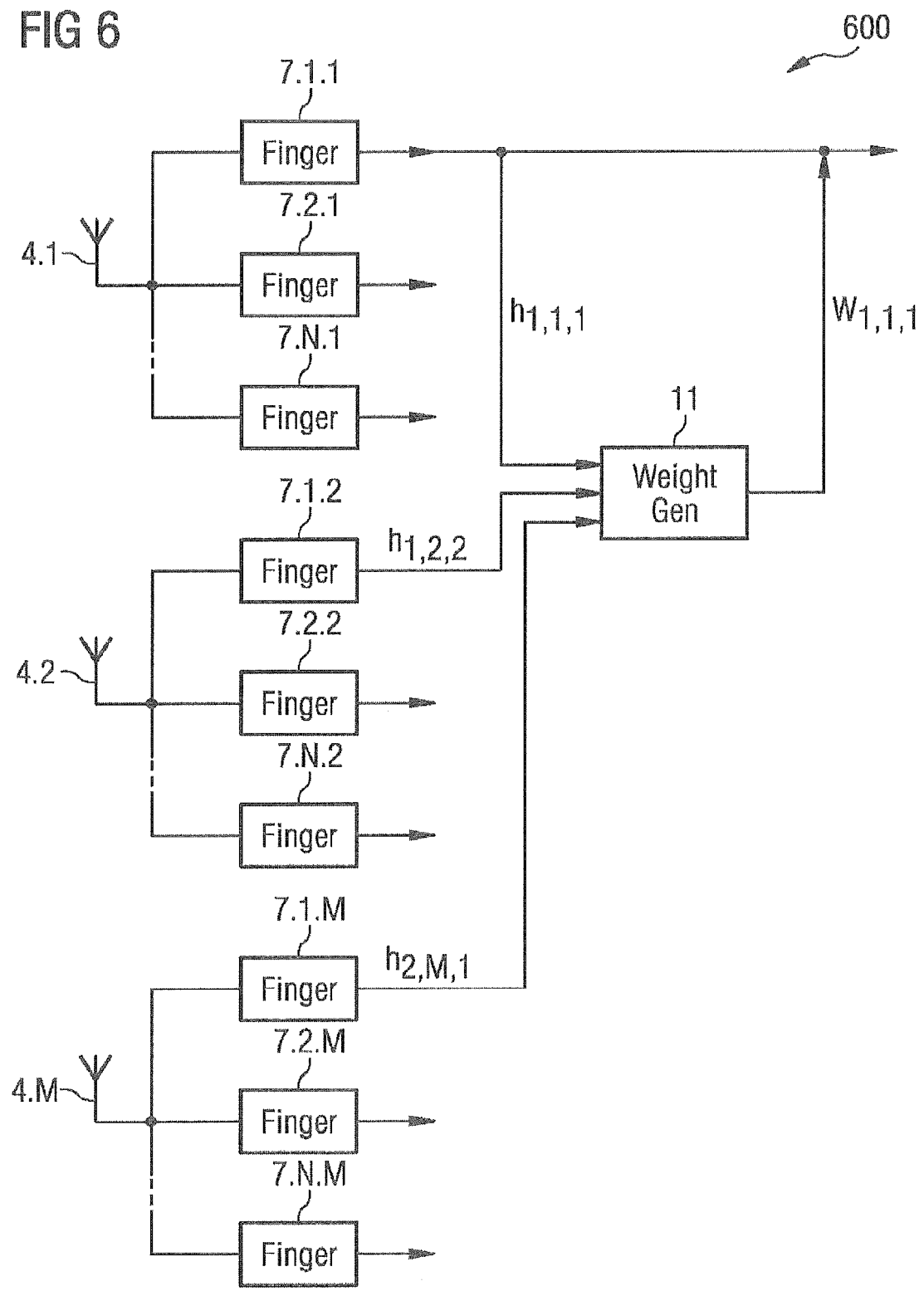
FIG. 6 schematically illustrates a receiver 600 as a further exemplary embodiment.

FIG. 6 schematically illustrates a receiver 600 as a further exemplary embodiment. The arrangement and components of the receiver 600 are similar to the arrangement and the components of the receiver 400. The weighting factor generator 11 receives three signals including information on channel weights $h_{1,1,1}$, $h_{1,2,2}$ and $h_{2,m,1}$ of the corresponding first signals. For example, the signal output by the RAKE finger 7.1.M includes information on the channel weight $h_{2,m,1}$ related to a transmission of the signal broadcast by the second transmit antenna, transmitted via the first transmission path (i.e. processed in the first RAKE finger) and received by the M-th receive antenna. From FIG. 6, it becomes apparent that the generated weighting factor $w_{1,1,1}$ depends on channel weights of first signals which are generated by at least two of the plurality of sets of RAKE fingers and received from at least two of the plurality of transmit antennas. Further, at least two of the first signals used to generate the at least one of the weighting factors are received from the same transmission path.

A mathematical scheme for generating weighting factors, for example by the weighting factor generators 11 of previous figures, will be explained in the following. The mathematical scheme relates to a radio frequency communications system based on an open loop transmit diversity technique and particularly based on a Space Time Transmit Diversity (STTD) scheme. An STTD scheme will briefly be explained in connection with FIG. 7.

Figure 7:
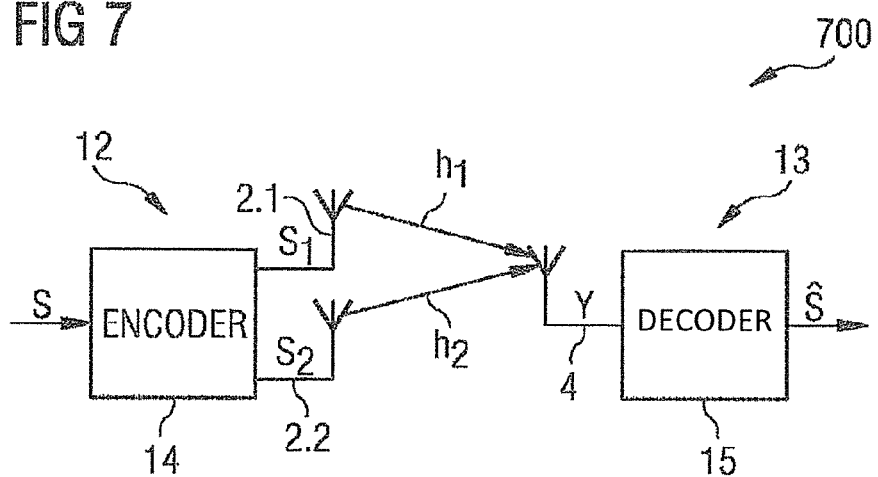
FIG. 7 schematically illustrates a radio frequency communications system 700.

FIG. 7 schematically illustrates a radio frequency communications system 700 including a transmitter 12 and a receiver 13. The transmitter 12 includes an encoder 14 and two transmit antennas 2.1, 2.2 configured to broadcast data signals $s_1$, $s_2$ via transmission channels indicated by arrows and channel coefficients $h_1$ and $h_2$. The receiver 13 includes a receive antenna 4 and a decoder 15. It is understood that the transmitter 12 and the receiver 13 may include further components which are not illustrated for the sake of simplicity. For example, the receiver 13 may include further receive antennas.

The encoder 14 receives a signal s including data that is to be transmitted (transmit data) over the two transmit antennas 2.1, 2.2. The transmit data may be processed according to a particular permutation, wherein two consecutive complex data symbols s(m) and s(m+1) of the data streams may be pairwise mapped as follows:

$$s_1(m) = s(m), \tag{1}$$

$$s_1(m+1) = s(m+1), \tag{2}$$

$$s_2(m) = -s^*(m+1) \tag{3}$$

and $$s_2(m+1) = s^*(m). \tag{4}$$

The symbol m corresponds to a time index labeling the m-th symbol while $s_1$ and $s_2$ denote data symbols transmitted over the first transmit antenna 2.1 and the second transmit antenna 2.2, respectively. The asterisk or star symbol "*" denotes complex conjugation.

The encoded transmit data is transmitted by the two transmit antennas 2.1, 2.2. The first data stream broadcast by the first transmit antenna 2.1 is transmitted over a first transmission channel (see first channel coefficient $h_1$) while the second data stream sent by the second transmit antenna 2.2 is transmitted over a second transmission channel (see second channel coefficient $h_2$). Successive data symbols y(m) and y(m+1) received at the receive antenna 4 may be written as $$y(m) = h_1 s(m) - h_2 s^*(m+1) + n(m) \tag{5}$$

and $$y(m+1) = h_1 s(m+1) + h_2 s^*(m) + n(m+1), \tag{6}$$

wherein the variable "n" denotes additive white Gaussian noise.

The signal y is decoded by the decoder 15 in compliance with the mapping scheme that has been used by the encoder 14 (see equations (1) to (4)). The decoded signal ŝ output by the decoder 15 may be written as $$\begin{pmatrix} \hat{s}(m) \\ \hat{s}(m+1) \end{pmatrix} = \frac{1}{|h_1|^2 + |h_2|^2} \begin{pmatrix} h_1 & h_2^* \\ -h_2 & h_1^* \end{pmatrix} \begin{pmatrix} y^*(m) \\ y(m+1) \end{pmatrix}. \tag{7}$$

The mathematical scheme for generating weighting factors, as explained in the following, considers a RAKE receiver including two receive antennas. The signal received at the j-th receive antenna (j∈{1,2}) and processed in the k-th RAKE finger may generally be expressed as $y_{j,k}$. In particular, the signals received at the first receive antenna (j=1) and the second receive antenna (j=2), processed in the 0-th RAKE finger (k=0) at two consecutive times 1 and 1+1 may be written as $$y_{1,0}(l) = h_{0,1,0} s_0 - h_{1,1,0} s^*_1 + f_{1,0}(l) + n_{1,0}(l) \tag{8}$$

$$y^*_{1,0}(l+1) = h^*_{0,1,0} s^*_1 + h^*_{1,1,0} s_0 + f_{1,0}(l+1) + n^*_{1,0}(l+1), \tag{9}$$

$$y_{2,0}(l) = h_{0,2,0} s_0 - h_{1,2,0} s^*_1 + f_{2,0}(l) + n_{2,0}(l) \tag{10}$$

and $$y^*_{2,0}(l) = h^*_{0,2,0} s_1 + h^*_{1,2,0} s^*_0 + f_{2,0}(l) + n^*_{2,0}(l) \tag{11}$$

Here, $h_{i,j,k}$ denotes the channel weight related to the signal sent by the i-th transmit antenna (i∈{0,1}), received by the j-th receive antenna (j∈{1,2}) and transmitted via the k-th transmission path. The variables $f_{j,k}$ and $n_{j,k}$ denote interference and noise, respectively.

The interference terms may be written as $$f_{1,0}(l) = \sqrt{\frac{E_L}{SF}} \sum_{j \neq 0} (h_{0,1,j} i_{0,1,j}(l) + h_{1,1,j} i_{1,1,j}(l)), \tag{12}$$

$$f_{1,0}(l+1) = \sqrt{\frac{E_L}{SF}} \sum_{j \neq 0} (h^*_{0,1,j} i^*_{0,1,j}(l+1) + h^*_{1,1,j} i^*_{1,1,j}(l+1)), \tag{13}$$

$$f_{2,0}(l) = \sqrt{\frac{E_L}{SF}} \sum_{j \neq} (h_{0,2,j} i_{0,2,j}(l) + h_{1,2,j} i_{1,2,j}(l)) \tag{14}$$

and $$f_{2,0}(l+1) = \sqrt{\frac{E_L}{SF}} \sum_{j \neq 0} (h^*_{0,2,j} i^*_{0,2,j}(l+1) + h^*_{1,2,j} i^*_{1,2,j}(l+1)), \tag{15}$$

wherein the variables $E_L$ and SF denote the cell load and the used spreading factor, respectively. The variable $i_{i,j,k}$ denotes the interference seen on each RAKE finger. Each of the sums runs over all RAKE fingers except the zeroth RAKE finger.

For generating the weighting factors, the values of an autocorrelation matrix $R_E$ are required. Combining the interference and noise terms to vectors $$F = \begin{pmatrix} f_{1,0}(l) \\ f^*_{1,0}(l+1) \\ f_{2,0}(l) \\ f^*_{2,0}(l+1) \end{pmatrix} \tag{16}$$

and

-continued $$N = \begin{pmatrix} n_{1,0}(l) \\ n_{1,0}^*(l+1) \\ n_{2,0}(l) \\ n_{2,0}^*(l+1) \end{pmatrix}, \quad (17)$$

the auto-correlation matrix $R_E$ may be calculated to $$R_E = E\{(F+N)(F+N)^H\} = E\{FF^H\} + E\{NN^H\} \quad (18)$$

The function E denotes the expectation value and the superscript H denotes hermitian transposition.

Using the relations $$i_{0,1,j}(l) = i_{0,2,j}(l) = i_{0,j}(l), \quad (19)$$

$$i_{1,1,j}(l) = i_{1,2,j}(l) = i_{1,j}(l), \quad (20)$$

$$i_{0,1,j}(l+1) = i_{0,2,j}(l+1) = i_{0,j}(l+1), \quad (21)$$

$$i_{1,1,j}(l+1) = i_{1,2,j}(l+1) = i_{1,j}(l+1), \quad (22)$$

and $$E\{i_{0,j}(l)i^*_{0,j}(l)\} = 1, \quad (23)$$

$$E\{i_{1,j}(l)i^*_{1,j}(l)\} = 1, \quad (24)$$

$$E\{i_{0,j}(l+1)i^*_{0,j}(l+1)\} = 1, \quad (25)$$

$$E\{i_{1,j}(l+1)i^*_{1,j}(l+1)\} = 1, \quad (26)$$

the auto-correlation matrix $R_E$ may be written as the (4×4)-matrix $$R_E = \begin{bmatrix} \frac{E_L}{SF}\sum_{j\neq 0}\begin{pmatrix} h_{0,1,j}h^*_{0,1,j} + \\ h_{1,1,j}h^*_{1,1,j} \end{pmatrix} & 0 & \frac{E_L}{SF}\sum_{j\neq 0}\begin{pmatrix} h_{0,1,j}h^*_{0,2,j} + \\ h_{1,1,j}h^*_{1,2,j} \end{pmatrix} & 0 \\ 0 & \frac{E_L}{SF}\sum_{j\neq 0}\begin{pmatrix} h^*_{0,1,j}h_{0,1,j} + \\ h^*_{1,1,j}h_{1,1,j} \end{pmatrix} & 0 & \frac{E_L}{SF}\sum_{j\neq 0}\begin{pmatrix} h^*_{0,1,j}h_{0,2,j} + \\ h^*_{1,1,j}h_{1,2,j} \end{pmatrix} \\ \frac{E_L}{SF}\sum_{j\neq 0}\begin{pmatrix} h_{0,2,j}h^*_{0,1,j} + \\ h_{1,2,j}h^*_{1,1,j} \end{pmatrix} & 0 & \frac{E_L}{SF}\sum_{j\neq 0}\begin{pmatrix} h_{0,2,j}h^*_{0,2,j} + \\ h_{1,2,j}h^*_{1,2,j} \end{pmatrix} & 0 \\ 0 & \frac{E_L}{SF}\sum_{j\neq 0}\begin{pmatrix} h^*_{0,2,j}h_{0,1,j} + \\ h^*_{1,2,j}h_{1,1,j} \end{pmatrix} & 0 & \frac{E_L}{SF}\sum_{j\neq 0}\begin{pmatrix} h^*_{0,2,j}h_{0,2,j} + \\ h^*_{1,2,j}h_{1,2,j} \end{pmatrix} \end{bmatrix}. \quad (27)$$

Introducing variables $\alpha$, $\beta$, $\delta$ and denoting the interferences from other cells by the variable $I_{oc}$, the auto-correlation matrix $R_E$ may be written as $$R_E = \begin{bmatrix} \alpha + \frac{I_{oc}}{SF} & 0 & \beta & 0 \\ 0 & \alpha + \frac{I_{oc}}{SF} & 0 & \beta^* \\ \beta^* & 0 & \delta + \frac{I_{oc}}{SF} & 0 \\ 0 & \beta & 0 & \delta + \frac{I_{oc}}{SF} \end{bmatrix}, \quad (28)$$

wherein the term "other cells" may refer to all cells except the considered cell. Introducing real valued variables a, c and a complex valued variable b, the auto-correlation matrix $R_E$ takes the form $$R_E = \begin{bmatrix} a & 0 & b & 0 \\ 0 & a & 0 & b^* \\ b^* & 0 & c & 0 \\ 0 & b & 0 & c \end{bmatrix}. \quad (29)$$

The inverse of the auto-correlation matrix $R_E$ may be calculated to $$R_E^{-1} = \quad (30)$$

$$\frac{1}{\det(R_E)} \begin{bmatrix} ac^2 - |b|^2 c & 0 & b|b|^2 - bac & 0 \\ 0 & ac^2 - |b|^2 c & 0 & b^*|b|^2 - b^*ac \\ b^*|b|^2 - b^*ac & 0 & a^2c - a|b|^2 & 0 \\ 0 & b|b|^2 - abc & 0 & a^2c - a|b|^2 \end{bmatrix},$$

wherein $\det(R_E)$ denotes the determinant of the auto-correlation matrix $R_E$:

$$\det(R_E) = a^2c^2 + |b|^4 - a|b|^2c - a|b|^2c. \quad (31)$$

Further introducing real valued variables $\alpha'$, $\delta'$ and a complex valued variable $\beta'$, the inverse of the auto-correlation matrix may be written as $$R_E^{-1} = \begin{bmatrix} \alpha' & 0 & \beta' & 0 \\ 0 & \alpha' & 0 & \beta'^* \\ \beta'^* & 0 & \delta' & 0 \\ 0 & \beta' & 0 & \delta' \end{bmatrix}. \quad (32)$$

Knowing the channel weights and the inverse of the auto-correlation matrix, the weighting factors may be calculated according to the equation $$w = H^+ R_E^{-1}. \quad (33)$$

Here, w denotes a (4×2)-matrix $$w = \begin{bmatrix} w_{0,1,1} & -w_{1,1,0} \\ w^*_{1,1,0} & w^*_{0,1,0} \\ w_{0,2,0} & -w_{1,2,0} \\ w^*_{1,2,0} & w^*_{0,2,0} \end{bmatrix} \quad (34)$$

including the required weights. Further, H$^+$ denotes the hermitian conjugate of a (4×2)-matrix including the channel weights $$H = \begin{bmatrix} h_{0,1,1} & -h_{1,1,0} \\ h^*_{1,1,0} & h^*_{0,1,0} \\ h_{0,2,0} & -h_{1,2,0} \\ h^*_{1,2,0} & h_{0,2,0} \end{bmatrix} \quad (35)$$

and $R_E^{-1}$ denotes the (4×4) auto-correlation matrix of equation (30).

A further mathematical scheme for generating weighting factors, for example by the weighting factor generators 11 of previous figures will be explained in the following. The mathematical scheme relates to a radio frequency communications system based on a closed loop transmit diversity technique which will briefly be explained in connection with FIG. 8.

Figure 8:
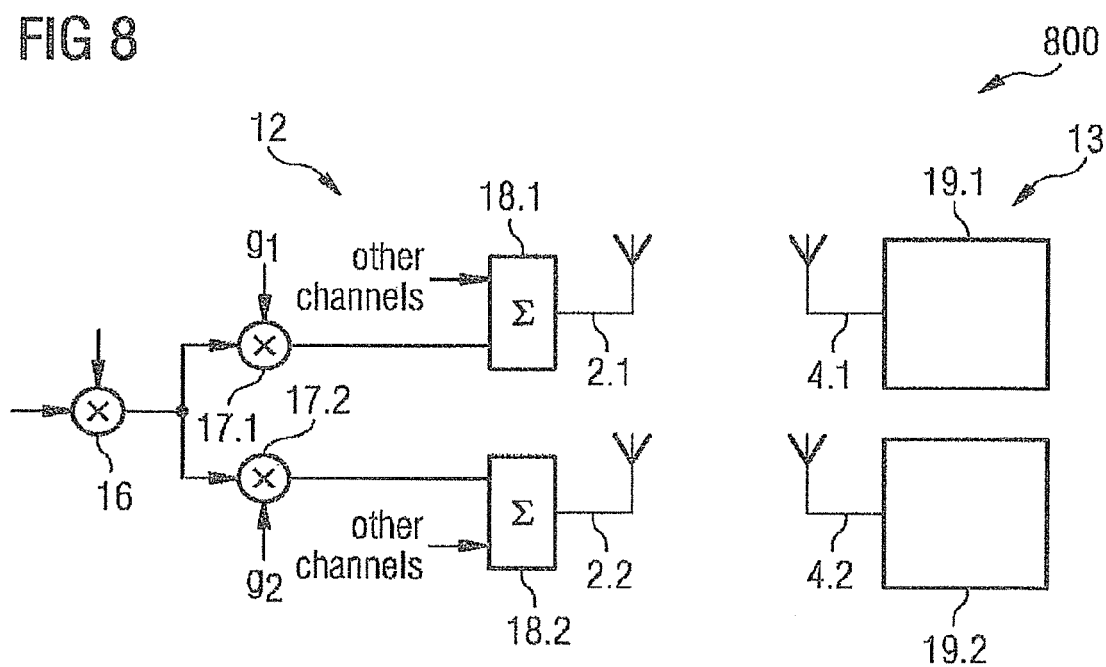
FIG. 8 schematically illustrates a radio frequency communications system 800.

FIG. 8 schematically illustrates a radio frequency communications system 800 including a transmitter 12 and a receiver 13. The transmitter 12 includes a multiplier 16 to spread and/or scramble transmit data, multipliers 17.1, 17.2, combining units 18.1, 18.2 and transmit antennas 2.1, 2.2. The receiver 13 includes receive antennas 4.1, 4.2 and processing units 19.1, 19.2 connected to the receive antennas 4.1, 4.2. For example, each of the processing units 19.1, 19.2 may include a set of RAKE fingers to generate first signals, wherein each set of RAKE fingers is connected to a respective one of the receive antennas 4.1, 4.2.

During an operation of the radio frequency communications system 800, transmit data is spread and/or scrambled by the multiplier 16 using a spreading and/or scrambling code. For example, the transmit data may include data that is to be transmitted over a Dedicated Physical Control Channel (DPCCH) and a Dedicated Physical Data Channel (DPDCH), respectively. The spread and/or scrambled data is forwarded to the multipliers 17.1, 17.2 to weight the data with complex weights $g_1$ and $g_2$, respectively. The weights $g_1$ and $g_2$ may be generated on the basis of a feedback information (FBI) message. The feedback information may be generated by a unit (not shown) of the receiver 13 and may include information about a transmission channel of radio signals transmitted between the transmitter 12 and the receiver 13. The feedback information is transmitted from the receiver 13 to the transmitter 12.

The weighted data streams are forwarded to the combining units 18.1, 18.2 to be combined with data of another channel, for example a Common Pilot Channel (CPICH). In particular, the data weighted with the first weight $g_1$ may be combined with data of a first CPICH and the data weighted with the second weight $g_2$ may be combined with data of a second CPICH. The combined data is broadcast over the transmit antennas 2.1 and 2.2. After a transmission over the air interface, the data is received by the receive antennas 4.1, 4.2 and forwarded to the processing units 19.1, 19.2.

The signals received at the first and the second receive antennas 4.1 and 4.2 may be written as $$y_{1,0}(h_{1,1,0}g_1 + h_{2,1,0}g_2)s + f_{1,0} + n_{1,0} \quad (36)$$

and $$y_{2,0}(h_{1,2,0}g_1 + h_{2,2,0}g_2)s + f_{2,0} + n_{2,0} \quad (37)$$

respectively. Note that the variables of equations (36) and (37) have already been described in previous paragraphs.

Combining the weights $g_1$ and $g_2$ and the channel weights $h_{1,2,0}$ and $h_{2,2,0}$ to vectors, equations (36) and (37) may be written as $$y_{1,0} = [h_{1,1,0} \; h_{2,1,0}] \begin{bmatrix} g_1 \\ g_2 \end{bmatrix} s + n_1 \text{ and} \quad (38)$$

$$y_{2,0} = [h_{1,2,0} \; h_{2,2,0}] \begin{bmatrix} g_1 \\ g_2 \end{bmatrix} s + n_2. \quad (39)$$

Equations (38) and (39) may be combined to a matrix equation $$Y = H_g G s + N \quad (40)$$

By defining $$H = H_g G, \quad (41)$$

equation (40) may be written as $$Y = Hs + N. \quad (42)$$

The interference terms related to the zeroth RAKE finger may be written as $$f_{1,0}(k) = \sqrt{\frac{E_L}{SF}} \sum_{j \neq 0} (h_{1,1,j} i_{1,1,j} + h_{2,1,j} i_{2,1,j}) \text{ and} \quad (43)$$

$$f_{2,0}(k) = \sqrt{\frac{E_L}{SF}} \sum_{j \neq 0} (h_{1,2,j} i_{1,2,j} + h_{2,2,j} i_{2,2,j}) \quad (44)$$

wherein the sums run over all RAKE fingers except the zeroth RAKE finger.

Using the relations $$i_{1,1,j} = i_{1,2,j} = i_{1,j}, \quad (45)$$

$$i_{2,1,j} = i_{2,2,j} = i_{2,j}, \quad (46)$$

and $$E\{i_{1,j} i^*_{1,j}\} = E\{i_{2,j} i^*_{2,j}\} = 1, \quad (47)$$

$$E\{i_{1,j} i^*_{2,j}\} = E\{i_{2,j} i^*_{1,j}\} = 0, \quad (48)$$

the components of the auto-correlation matrix $$R_E = \begin{bmatrix} R_{E,1,1} & R_{E,1,2} \\ R^*_{E,1,2} & R_{E,2,2} \end{bmatrix} \quad (49)$$

may be written as $$R_{E,1,1} = \frac{E_L}{SF}\sum_{j\neq i}(h_{1,1,j}h^*_{1,1,j} + h_{2,1,j}h^*_{2,1,j}) + \frac{I_{oc}}{SF}, \quad (50)$$

$$R_{E,1,2} = R^*_{E,2,1} = \frac{E_L}{SF}\sum_{j\neq i}(h_{1,1,j}h^*_{1,2,j} + h_{2,1,j}h^*_{2,2,j}) \quad (51)$$

and $$R_{E,2,2} = \frac{E_L}{SF}\sum_{j\neq i}(h_{1,2,j}h^*_{1,2,j} + h_{2,2,j}h^*_{2,2,j}) + \frac{I_{oc}}{SF}. \quad (52)$$

Equations (50) to (52) correspond to the entries of the auto-correlation matrix for the i-th RAKE finger with each of the sums running over all RAKE fingers except the i-th RAKE finger. In a next step, the auto-correlation matrix may be inverted to obtain $R_E^{-1}$. Knowing the channel weights and the inverse of the auto-correlation matrix, the weights may be calculated according to equation (33).

The mathematical scheme further provides a possibility of generating the weights $g_1$ and $g_2$. For example, the weights may be generated by maximizing the quadratic form $$\sum_{fingers} G^H H^H HG, \quad (53)$$

with the sum running over all RAKE fingers. By additionally taking into account the auto-correlation matrix $R_E$, the weights may be generated by maximizing the quadratic form $$\sum_{fingers} (G^H H_g^H R_E^{-1} H_g G). \quad (54)$$

The quadratic form (54) may be written as $$\sum_j [1\ g_2^*]\begin{bmatrix}h^*_{1,1,j} & h^*_{1,2,j}\\ h^*_{2,1,j} & h^*_{2,2,j}\end{bmatrix}\begin{bmatrix}a_j & b_j\\ b_j^* & c_j\end{bmatrix}\begin{bmatrix}h_{1,1,j} & h_{2,1,j}\\ h_{1,2,j} & h_{2,2,j}\end{bmatrix}\begin{bmatrix}1\\ g_2\end{bmatrix}, \quad (55)$$

wherein the variables $a_j$, $b_j$, $c_j$ correspond to entries of the inverse of the auto-correlation matrix $R_E$. Note that, since the weight $g_1$ depends on the weight $g_2$, equation (55) may be written in a form not including the weight $g_1$. The quadratic form of equation (55) may be expressed as $$\sum_j \alpha_j + 2Re\{g_2\beta_j\} + |g_2|^2 \delta_j, \quad (56)$$

the variables $\alpha_j$, $\beta_j$ and $\delta_j$ being defined by $$\alpha_j = ah_{1,1,j}h^*_{1,1,j} + bh_{1,2,j}h^*_{1,1,j} + b^*h_{1,1,j}h^*_{1,2,j} + ch_{1,2,j}h^*_{1,2,j}, \quad (57)$$

$$\beta_j = ah_{2,1,j}h^*_{1,1,j} + bh_{2,2,j}h^*_{1,1,j} + b^*h_{2,1,j}h^*_{1,2,j} + ch_{2,2,j}h^*_{1,2,j}, \quad (58)$$

and $$\delta_j = ah_{2,1,j}h^*_{2,1,j} + bh_{2,2,j}h^*_{2,1,j} + b^*h_{2,1,j}h^*_{2,2,j} + ch_{2,2,j}h^*_{2,2,j}, \quad (59)$$

The quadratic form of equation (56) may be simplified by neglecting the first and third terms which results in $$\sum_j 2Re\{g_2\beta_j\}. \quad (60)$$

Figure 9:
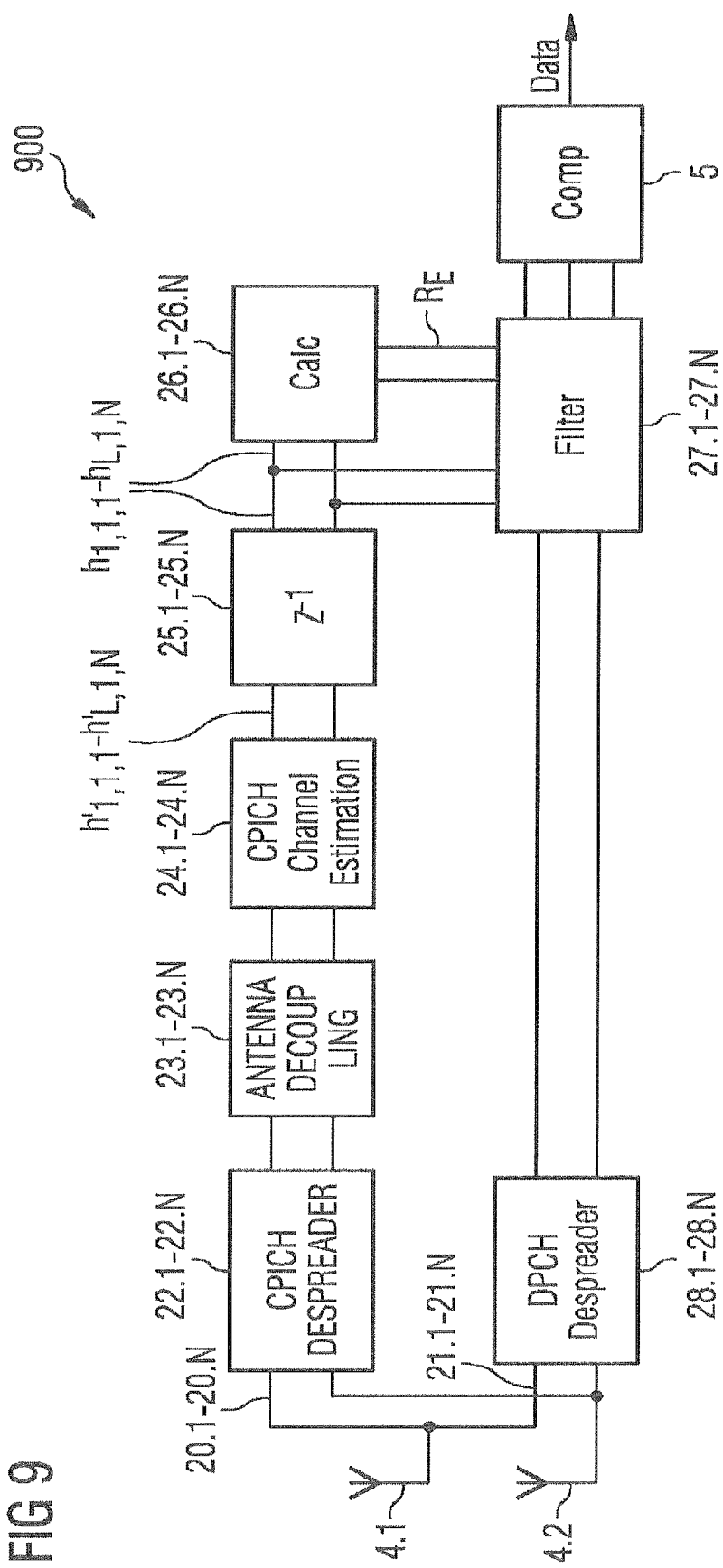
FIG. 9 schematically illustrates a receiver 900 as a further exemplary embodiment.

FIG. 9 schematically illustrates a receiver 900 as a further exemplary embodiment. The receiver 900 includes two receive antennas 4.1 and 4.2. The first receive antenna 4.1 is coupled to an upper set of N signal paths 20.1 to 20.N and a lower set of N signal paths 21.1 to 21.N. The variable N corresponds to a number of considered transmission paths or RAKE fingers. For the sake of simplicity, the pluralities of signals paths 20.1 to 20.N and 21.1 to 21.N are indicated by single lines, i.e. not every single signal path is explicitly illustrated.

Each of the upper signal paths 20.1 to 20.N may include a despreader 22.1 to 22.N configured to despread signals transmitted over a common pilot channel (CPICH) and an antenna decoupling unit 23.1 to 23.N to decouple received data with respect to the transmit antennas the data was sent from. The antenna decoupling unit 23.1 to 23.N is configured to separate the pilots of the received signal on the basis of the known pilot sequences. For example, each of the antenna decoupling units 23.1 to 23.N may provide at its output L data streams, wherein each of the L data streams includes data that was sent from one specific transmit antenna while the data sent from other transmit antennas has been filtered out. The variable L denotes the number of transmit antennas the received data was sent from. For the sake of simplicity an explicit illustration and indexing of these L data streams will be omitted in the following.

In addition, each of the upper signal paths 20.1 to 20.N may include a channel estimation unit 24.1 to 24.N configured to estimate channel weights of signals transmitted over a CPICH and a delay element 25.1 to 25.N. The output of each delay element 25.1 to 25.N is coupled to a calculation unit 26.1 to 26.N configured to generate coefficients of an auto-correlation matrix. The output of each delay element 25.1 to 25.N is coupled to a filter unit 27.1 to 27.N.

Each of the lower signal paths 21.1 to 21.N may include a despreader 28.1 to 28.N configured to despread signals transmitted over a downlink dedicated physical channel (DPCH). The outputs of the filter units 27.1 to 27.N are forwarded to a combining unit 5. The output of the combining unit 5 may be connected to further units of the receiver 900, for example a digital signal processor.

The receive antenna 4.1 receives radio signals which may contain data transmitted over a CPICH and a DPCH. The data received over a CPICH is processed in the upper N signal paths 20.1 to 20.N while the data received over DPCH is processed in the lower signal paths 21.1 to 21.N. The CPICH signals are despread by the despreader 22.1 to 22.N, wherein each of the despreaders 22.1 to 22.N may be included in a respective RAKE finger. Each of the despread CPICH signals is forwarded to a respective antenna decoupling unit 23.1 to 23.N such that the despread data may be decoupled with respect to the transmit antennas the data was sent from. The decoupled data is forwarded to a respective channel estimation unit 24.1 to 24.N, wherein each of the channel estimation units 24.1 to 24.N estimates channel weights for the despread CPICH signals. In this manner, N (undelayed) channel weights $h_{1,1,1}'$ to $h_{L,1,N}'$ may be obtained.

Each of the channel weights $h_{1,1,1}'$ to is delayed by a respective delay element 25.1 to 25.N. The delay corresponds to one channel estimation interval which in particular may correspond to 256 chips or 2560 chips. The outputs $h_{1,1,1}$ to $h_{L,1,N}$ of the delay elements 25.1 to 25.N represent channel weights of radio signals transmitted by L transmit antennas, received at the first receive antenna 4.1 and processed in the corresponding N signal paths 20.1 to 20.N. For the case of the receiver 900, the described channel estimation is based on data transmitted over CPICH. Each of the outputs $h_{1,1,1}$ to $h_{L,1,N}$ corresponds to a value of a channel weight matrix H (see e.g. equation (35)) and is forwarded to a respective calculation unit 26.1 to 26.N.

Similar to the receive antenna 4.1, the receive antenna 4.2. receives radio signals which are processed in a plurality of N upper signal paths and in a plurality of N lower signal paths. Since processing signals received at the receive antenna 4.1 corresponds to processing signals received at the receive antenna 4.2, further reference signs and comments on the procession of the signals received at the receive antenna 4.2 are omitted. In a similar way, the processing of radio signals received at the receive antenna 4.2 results in channel weights $h_{1,2,1}$ to $h_{L,2,N}$ which are also forwarded to the calculation units 26.1 to 26.N. Note that the channel weights $h_{1,1,1}$ to $h_{L,1,N}$ associated with the first receive antenna 4.1 may be obtained independently from the channel weights $h_{1,2,1}$ to $h_{L,2,N}$ associated with the second receive antenna 4.2 and vice versa. That is, generating the channel weights associated with one specific receive antenna does not depend on the overall structure of the communications system, i.e. the overall number of transmit and/or receive antennas.

Each of the calculation units 26.1 to 26.N may calculate an auto-correlation matrix $R_E$ according to equation (27) or equations (49) to (52). The auto-correlation matrix $R_E$ is forwarded from each calculation unit 26.1 to 26.N to a respective filter unit 27.1 to 27.N. Further, the channel weights $h_{1,1,1}$ to $h_{L,1,N}$ and $h_{1,2,1}$ to $h_{L,2,N}$ are sent to the filter units 27.1 to 27.N as well. In a next step, each of the filter units 27.1 to 27.N filters the despread CPICH signals using weighting factors calculated according to equation (33). Note that the auto-correlation matrix needs to be inverted for this purpose. For example, the required inversion may be performed in the calculation units 26.1 to 26.N or the filter units 27.1 to 27.N. The received DPCH signals despread by the despreaders 28.1 to 28.N are filtered in the same way. The outputs of the filters 27.1 to 27.N are then combined by the combining unit 5 in a way that has already been described in connection with previous figures.

Figure 10:
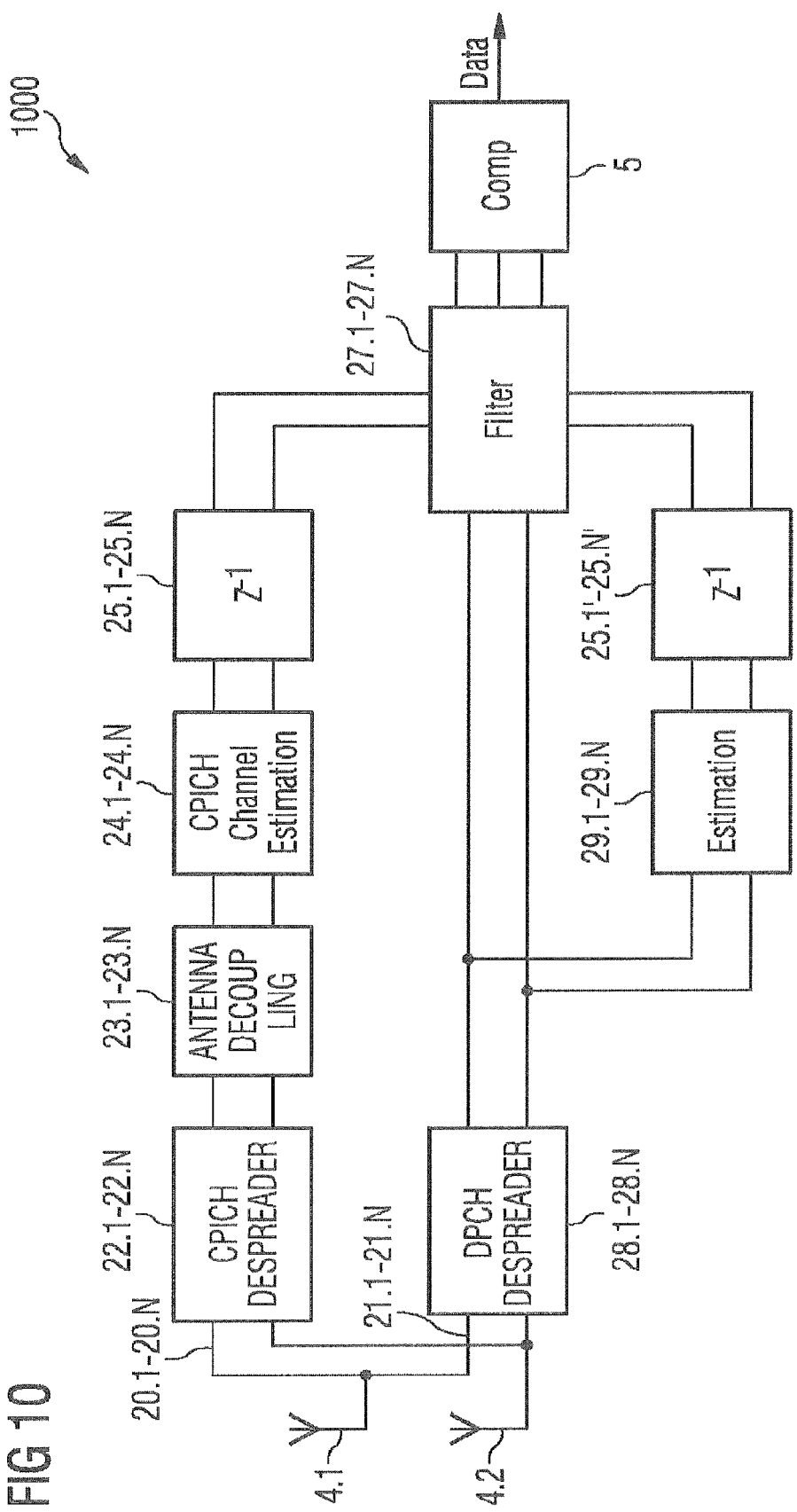
FIG. 10 schematically illustrates a receiver 1000 as a further exemplary embodiment.

FIG. 10 schematically illustrates a receiver 1000 as a further exemplary embodiment. The receiver 1000 includes two receive antennas 4.1 and 4.2. The first receive antenna 4.1 is coupled to an upper set of N signal paths 20.1 to 20.N and a lower set of signal paths 21.1 to 21.N. Again, the variable N corresponds to the number of considered transmission paths or RAKE fingers. For the sake of simplicity, the pluralities of signals paths 20.1 to 20.N and 21.1 to 21.N are indicated by single lines, i.e. not every single signal path is explicitly illustrated.

Each of the upper signal paths 20.1 to 20.N may include a despreader 22.1 to 22.N configured to despread signals transmitted over a CPICH and an antenna decoupling unit 23.1 to 23.N which has already been described in connection with FIG. 9. Further, each of the upper signal paths 20.1 to 20.N may include a despreader 22.1 to 22.N configured to despread signals transmitted over a CPICH, a channel estimation unit 24.1 to 24.N configured to estimate channel weights of signals transmitted over a CPICH and a delay element 25.1 to 25.N. The output of each delay element 25.1 to 25.N is coupled to a filter unit 27.1 to 27.N configured to filter signals.

Each of the lower signal paths 21.1 to 21.N may include a despreader 28.1 to 28.N configured to despread signals transmitted over a DPCH. Each of the despreaders 28.1 to 28.N includes a first output coupled to one of a plurality of estimation units 29.1 to 29.N configured to channel estimate the coefficients of auto-correlation matrices. A second output of the despreaders 28.1 to 28.N is coupled to one of a plurality of filter units 27.1 to 27.N. Each of the estimation units 29.1 to 29.N is coupled to one of N delay elements 25.1' to 25.N' which in turn are coupled to the respective filter units 27.1 to 27.N. The outputs of the filter units 27.1 to 27.N are coupled to a combining unit 5.

The receive antenna 4.1 receives radio signals which may include data transmitted over a CPICH and a DPCH. The data transmitted over a CPICH is processed in the upper N signal paths 20.1 to 20.N while the data transmitted over DPCH is processed in the lower signal paths 21.1 to 21.N. The CPICH signals are despread by the despreader 22.1 to 22.N, wherein each of the despreaders 22.1 to 22.N may be included in a RAKE finger. Each of the despread CPICH signals is forwarded to a respective antenna decoupling unit 23.1 to 23.N such that the despread data may be decoupled with respect to the transmit antennas the data was sent from. The decoupled data is forwarded to a respective channel estimation unit 24.1 to 24.N, with each of the channel estimation units 24.1 to 24.N estimating channel weights for the despread CPICH signals. This results in N (undelayed) channel weights $h_{1,1,1}'$ to $h_{L,1,N}'$.

Each of the channel weights $h_{1,1,1}'$ to $h_{L,1,1}'$ is delayed by a respective delay element 25.1 to 25.N. The delay corresponds to one channel estimation interval which in particular may correspond to 256 chips or 2560 chips. The outputs $h_{1,1,1}$ to $h_{L,1,N}$ of the delay elements 25.1 to 25.N represent channel weights of radio signals transmitted by L transmit antennas, received at the first antenna 4.1 and processed in the corresponding N signal paths 20.1 to 20.N. For the case of the receiver 1000, the described channel estimation for the channel weights $h_{1,1,1}$ to $h_{L,1,0}$ is based on data transmitted over a common pilot channel. Each of the outputs $h_{1,1,1}$ to $h_{L,1,N}$ corresponds to a value of a channel weight matrix H (see e.g. equation (35)) and is forwarded to a respective filter unit 27.1 to 27.N.

Similar to the receive antenna 4.1, the receive antenna 4.2. receives radio signals which are processed in a plurality of N upper signal paths and in a plurality of N lower signal paths. Since the processing of the signals received at the receive antennas 4.1 and 4.2 is similar, further reference signs and comments on the signal procession of signals received at the antenna 4.2 are omitted. In a similar way, the procession of the signals received at the receive antenna 4.2 results in channel weights $h_{1,2,1}$ to $h_{L,2,N}$ forwarded to the filter units 27.1 to 27.N as well.

The data received at the receive antenna 4.1 and transmitted over DPCH are processed in the lower N signal paths 21.1 to 21.N. The DPCH signals are despread by the despreader 28.1 to 28.N with each of the despreaders corresponding to a specific transmission path. Each of the N despread DPCH signals is forwarded to a respective estimation unit 29.1 to 29.N configured to estimate the coefficients of an auto-correlation matrix $R_E$ associated with the first antenna 4.1. Each of the estimated coefficients is delayed by a respective one of the delay elements 25.1' to 25.N'. The delay corresponds to one channel estimation interval that may in particular contain 256 chips or 2560 chips. The outputs of the delay elements 25.1' to 25.N' represent channel estimated auto-correlation coefficients of radio signals received at the first receive antenna 4.1. For the case of the receiver 1000, the channel estimation for the auto-correlation coefficients is based on data transmitted over DPCH. Each of the coefficients is forwarded to a respective filter unit 27.1 to 27.N.

In a similar way, processing the signals received at the receive antenna 4.2 results in coefficients of the auto-correlation matrix $R_E$ associated with the receive antenna 4.2. These coefficients are forwarded to a respective filter unit 27.1 to 27.N as well. In a next step, each of the filter units 27.1 to 27.N filters the despread CPICH signals using weighting factors calculated according to equation (33). The DPCH signals which have been despread by the despreaders 28.1 to 28.N are filtered in the same way. The outputs of the filters 27.1 to 27.N are then combined by the combining unit 5 as it has already been described in previous figures.

The interference cancellation as it has been described in the previous paragraphs may also take into account inter-cell interference, i.e. interference caused by signals different from the useful signal which are sent by other remote base stations transmitting on the same carrier frequency. For example, such signals may be a dominating source of interference in edge-of-cell/handover scenarios, i.e. when a receiver is located at the edge of a radio cell of a cellular network and/or a handover between two radio cells is performed. The radio cell may be served by at least one fixed-location transceiver known as cell site or base station.

Figure 11:
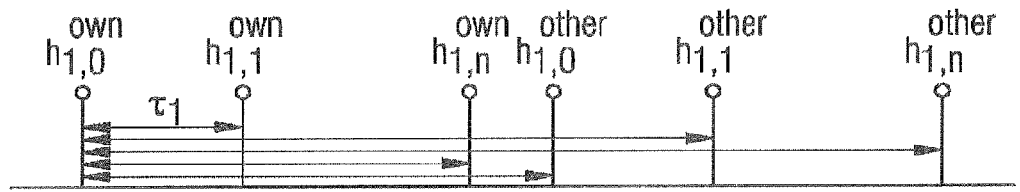
FIG. 11 schematically illustrates time delays between signals received at a receive antenna.

FIG. 11 schematically illustrates time delays between signals received at a receive antenna. FIG. 11 that are similar to FIG. 3A, but do not illustrate an explicit signal structure. For example, the time delay $\tau_1$ corresponds to a delay between a first signal transmitted over a first channel (see channel weight $h_{1,0}^{own}$) and a second signal transmitted over a second channel (see channel weight $h_{1,1}^{own}$). Here, the channel weight $h_{j,k}^{own}$ denotes a transmission channel related to a signal received at a j-th receive antenna and transmitted over a k-th transmission path. The superscript "own" denotes that the received signal was received from the transmitter (or base station) of the radio cell which is currently considered. In the following, this radio cell may also be referred to as "considered receiver radio cell". The superscript "other" of the channel weight $h_{j,k}^{other}$ denotes that the received signal was received from a transmitter belonging to a radio cell that differs from the considered receiver radio cell. For example, the other cell may be a cell neighboring the receiver radio cell and may or may not be part of the active set. The active set may be defined as the set of cells with which the receiver is performing a soft handover.

Figure 12:
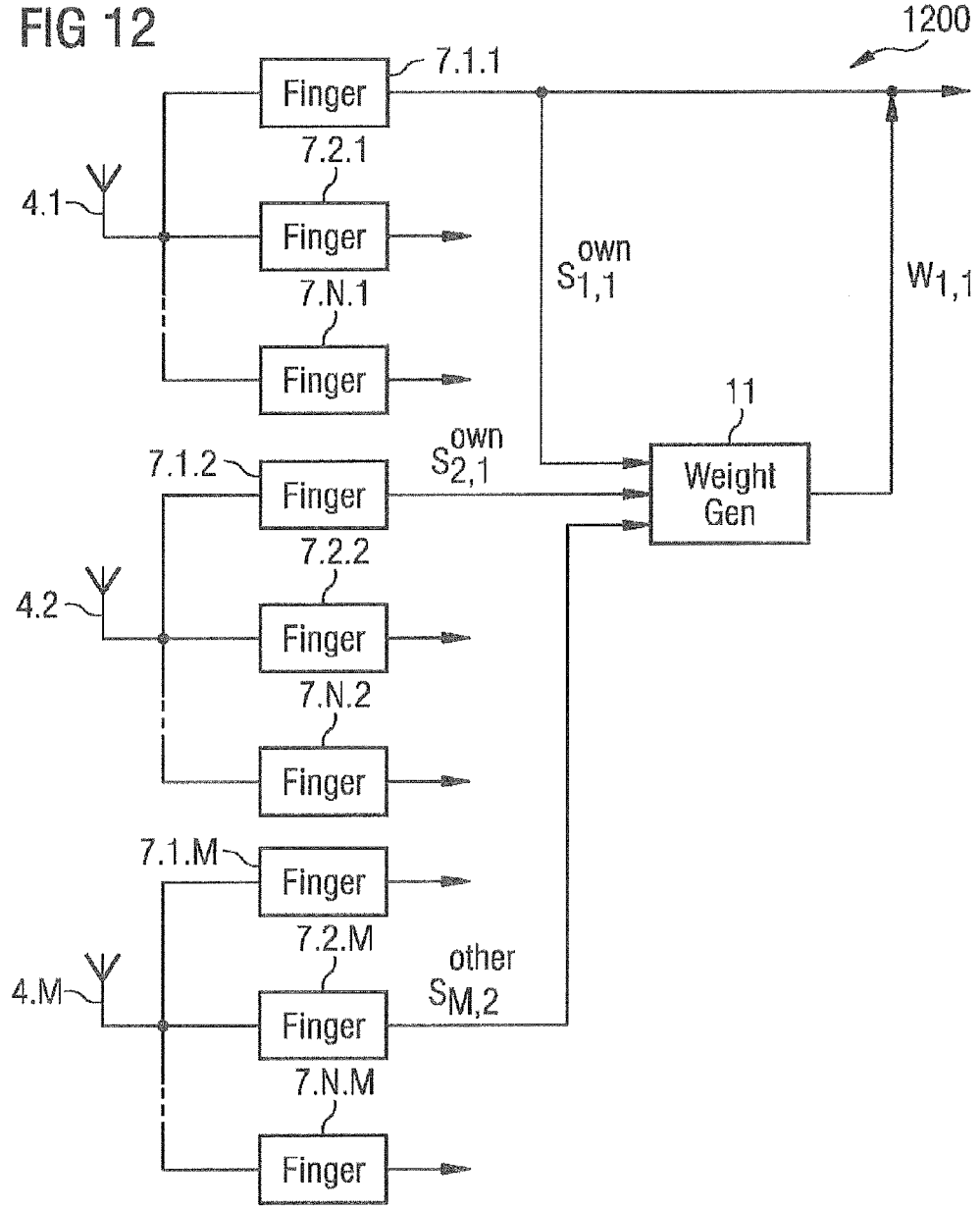
FIG. 12 schematically illustrates a receiver 1200 as a further exemplary embodiment.

FIG. 12 schematically illustrates a receiver 1200 as an exemplary embodiment. The receiver 1200 includes M receive antennas 4.1 to 4.M to receive radio signals from a plurality of transmission paths and from a plurality of radio cells as well as a plurality of sets of RAKE fingers 7.1.1 to 7.N.M. The RAKE fingers 7.1.1 to 7.N.M are configured to generate first signals, with each set of RAKE fingers being coupled to a respective one of the plurality of antennas. For example, the set of RAKE fingers 7.1.1 to 7.N.1 is coupled to the antenna 4.1. Accordingly, the set of RAKE fingers 7.1.1 to 7.N.1 processes radio signals received at the receive antenna 4.1, wherein the radio signals may have been sent by various radio cells via multiple transmission paths.

The receiver 1200 further includes a weighting factor generator 11 to generate weighting factors for weighting the first signals. In FIG. 12, the signals $s_{1,1}^{own}$, $s_{2,1}^{own}$ and $s_{M,2}^{other}$ are input into the weighting factor generator 11, wherein the two subscripts and the superscript correspond to the indices already explained in connection with FIG. 11. For example, the signal $s_{M,2}^{other}$ corresponds to a signal including data broadcast by a transmitter belonging to a radio cell differing from the considered receiver radio cell, transmitted over a second transmission channel (i.e. processed in the second RAKE finger) and received by the M-th receive antenna 4.M. The weighting factor generator 11 generates and outputs a weighting factor $w_{1,1}$ to weight the output of the RAKE finger 7.1.1. From FIG. 12, it becomes apparent that the weighting factor $w_{1,1}$ is generated by using first signals which are generated by at least two of the plurality of sets of RAKE fingers and received from at least two of the plurality of radio cells.

A mathematical scheme for generating the weighting factors as they may be generated by the weighting factor unit 11 of FIG. 12 will be explained in the following. Again, an auto-correlation matrix $$R_E = \begin{bmatrix} R_{E,1,1} & R_{E,1,2} \\ R_{E,1,2}^* & R_{E,2,2} \end{bmatrix} \tag{61}$$

is calculated, wherein the individual entries of the auto-correlation matrix for the i-th RAKE finger may be written as $$R_{1,1} = \frac{E_L^{own}}{SF} \sum_{j \neq i}^{N_{path}^{own}} h_{1,j}^{own} h_{1,j}^{*own} + \sum_{c=1}^{N_{othercells}} \frac{E_L^c}{SF} \sum_{j=1}^{N_{path}^c} h_{1,j}^c h_{1,j}^{*c} + \frac{I_{oc}}{SF}, \tag{62}$$

$$R_{1,2} = R_{2,1}^* = \frac{E_L^{own}}{SF} \sum_{j \neq i}^{N_{path}^{own}} h_{1,j}^{own} h_{2,j}^{*own} + \sum_{c=1}^{N_{othercells}} \frac{E_L^c}{SF} \sum_{j=1}^{N_{path}^c} h_{1,j}^c h_{2,j}^{*c} \tag{63}$$

and $$R_{2,2} = \frac{E_L^{own}}{SF} \sum_{j \neq i}^{N_{path}^{own}} h_{2,j}^{own} h_{2,j}^{*own} + \sum_{c=1}^{N_{othercells}} \frac{E_L^c}{SF} \sum_{j=1}^{N_{path}^c} h_{2,j}^c h_{2,j}^{*c} + \frac{I_{oc}}{SF}. \tag{64}$$

Note that the used variables have already been described in previous paragraphs.

In equations (62) to (64), the first sum runs over all RAKE fingers, i.e. transmission paths, associated with the considered receiver radio cell except the i-th RAKE finger. The second sum runs over all considered radio cells differing from the considered receiver radio cell. For example, the second sum may at least include one cell neighboring the receiver radio cell. Alternatively, the second sum may run over radio cells included in the active set of radio cells. The third sum runs over all RAKE fingers associated with a radio cell considered in the second sum.

The weighting factor generation according to equations (61) to (64) may be activated when a predefined condition is met. For example, a predefined condition may be met when the receiver is located at an edge of two radio cells and/or during a handover of the receiver between two radio cells.

FIG. 13 schematically illustrates a method 1300 in the form of a flow chart as an exemplary embodiment. The flow chart of FIG. 13 may, for example be read in connection with the receiver 400 of FIG. 4 in one embodiment, but is not so limited. In a first method step S1, radio signals from a plurality of transmit antennas are received by means of a plurality of receive antennas 4.1 to 4.M. In a second method step S2, first signals are generated by means of a plurality of sets of RAKE fingers 7.1.1 to 7.N.M, wherein each set of RAKE fingers is coupled to a respective one of the plurality of receive antennas 4.1 to 4.M. In a third method step S3, weighting factors are generated for weighting the first signals, wherein at least one of the weighting factors is generated by using first signals which are generated by at least two of the plurality of sets of RAKE fingers 7.1.1 to 7.N.M and received from at least two of the plurality of transmit antennas 4.1 to 4.M.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application.

What is claimed is:

1. A receiver, comprising:
   a plurality of receive antenna ports configured to receive radio signals from a plurality of transmit antennas;
   a plurality of sets of RAKE fingers configured to generate first signals based on the received radio signals, each set of RAKE fingers coupled to a respective one of the plurality of receive antenna ports; and
   a weighting factor generator configured to generate weighting factors for weighting the first signals, wherein at least one of the weighting factors is generated by using first signals that are generated by at least two of the plurality of sets of RAKE fingers and received from at least two of the plurality of transmit antennas, wherein each of the first signals used to generate the weighting factor comprises data received from only one of the plurality of transmit antennas.

2. The receiver of claim 1, wherein the radio signals are received at the plurality of receive antenna ports from a plurality of transmission paths and at least two of the first signals used to generate the at least one of the weighting factors are received from a same first transmission path.

3. The receiver of claim 2, wherein at least one of the first signals used to generate the at least one of the weighting factors is received from a second transmission path.

4. The receiver of claim 1, wherein the at least one of the weighting factors depends on channel weights of the first signals.

5. The receiver of claim 1, wherein the radio signals are received at the plurality of receive antenna ports from a plurality of transmission paths and the at least one of the weighting factors depends on all the first signals of one specific transmission path of the received radio signals.

6. The receiver of claim 1, further comprising:
   a decoder configured to decode signals encoded according to a Space Time Transmit Diversity (STTD) scheme.

7. The receiver of claim 1, further comprising:
   a decoder configured to decode signals encoded according to an open loop transmit diversity technique.

8. The receiver of claim 1, further comprising:
   a unit configured to generate data comprising a feedback information about a transmission channel of the radio signals and configured to provide the feedback information to a transmitter.

9. The receiver of claim 1, further comprising:
   a decoupling unit configured to decouple the received radio signals into decoupled signals, wherein each of the decoupled signals comprise data received from only one of the plurality of transmit antennas.

10. The receiver of claim 1, further comprising:
    a channel estimation unit configured to estimate channel weights of the first signals used to generate the at least one of the weighting factors.

11. The receiver of claim 1, further comprising:
    a weighting unit configured to weight the first signals with the weighting factors and configured to combine the weighted signals.

12. The receiver of claim 1, wherein the weighting factor generator comprises a Wiener filter.

13. The receiver of claim 1, wherein the at least one of the weighting factors depends on at least one of a cross-correlation vector and an auto-correlation matrix.

14. A method, comprising:
    receiving radio signals from a plurality of transmit antennas by means of a plurality of receive antenna ports;
    generating first signals by means of a plurality of sets of RAKE fingers, wherein each set of RAKE fingers is coupled to a respective one of the plurality of receive antenna ports; and
    generating weighting factors for weighting the first signals, wherein at least one of the weighting factors is generated by using first signals that are generated by at least two of the plurality of sets of RAKE fingers and received from at least two of the plurality of transmit antennas, wherein each of the first signals used to generate the weighting factor comprises data received from only one of the plurality of transmit antennas.

15. The method of claim 14, wherein the radio signals are received from a plurality of transmission paths, and wherein at least two of the first signals used to generate the at least one of the weighting factors are received from an identical first transmission path.

16. The method of claim 14, wherein the at least one of the weighting factors depends on channel weights of the first signals that are used to generate the at least one of the weighting factors.

17. The method of claim 14, further comprising:
    decoupling the received radio signals into decoupled signals, wherein each of the decoupled signals comprise data received from only one of the plurality of transmit antennas.

18. The method of claim 14, further comprising:
    estimating the channel weights of the first signals used to generate the at least one of the weighting factors.

19. The method of claim 14, further comprising:
    weighting the first signals with the weighting factors and combining the weighted signals.

20. A receiver, comprising:
    a first receive antenna port and a second receive antenna port configured to receive radio signals from a first transmit antenna and a second transmit antenna;
    a plurality of first RAKE fingers, coupled to the first receive antenna port, and configured to generate first signals based on received signals at the first receive antenna port;
    a plurality of second RAKE fingers, coupled to the second receive antenna port, and configured to generate second signals based on received signals at the second receive antenna port; and
    a weighting factor generator configured to generate a weighting factor for weighting one of the first signals, wherein the weighting factor is generated by using at least one of the first signals and at least one of the second signals and wherein the at least one of the first signals is received from the first transmit antenna and the at least one of the second signals is received from the second transmit antenna, wherein each of the first signals used to generate the weighting factor comprises data received from only one of the plurality of transmit antennas.

21. A receiver, comprising:
a plurality of receive antenna ports configured to receive radio signals from a plurality of transmit antennas and from a plurality of transmission paths;
a plurality of sets of RAKE fingers configured to generate first signals based on the received radio signals, each set of RAKE fingers coupled to a respective one of the plurality of receive antenna ports; and
a weighting factor generator configured to generate weighting factors for weighting the first signals, wherein at least one of the weighting factors depends on channel weights of first signals that are generated by at least two of the plurality of sets of RAKE fingers and received from at least two of the plurality of transmit antennas and wherein at least two of the first signals used to generate the at least one of the weighting factors are received from the same transmission path, wherein each of the first signals used to generate the weighting factor comprises data received from only one of the plurality of transmit antennas.

22. A receiver, comprising:
a plurality of receive antenna ports configured to receive radio signals from a plurality of transmission paths and from a plurality of radio cells;
a plurality of sets of RAKE fingers configured to generate first signals based on the received radio signals, each set of RAKE fingers coupled to a respective one of the plurality of receive antenna ports; and
a weighting factor generator configured to generate weighting factors for weighting the first signals, wherein at least one of the weighting factors is generated by using first signals that are generated by at least two of the plurality of sets of RAKE fingers and received from at least two of the plurality of radio cells, wherein each of the first signals used to generate the weighting factor comprises data received from only one of the plurality of radio cells.

23. The receiver of claim 22, wherein the at least two radio cells comprise a first radio cell in which the receiver is located and a second radio cell neighboring the first radio cell.

24. The receiver of claim 22, wherein the weighting factor generator is activated when a predefined condition is met, wherein the predefined condition comprises locating the receiver at an edge of the at least two radio cells.

25. The receiver of claim 22, wherein the at least two radio cells comprise a radio cell of the active set of radio cells.

\* \* \* \* \*